US012691542B2

(12) United States Patent (10) Patent No.: US 12,691,542 B2
Yamazaki et al. (45) Date of Patent: Jul. 28, 2026

(54) PROTECTIVE DEVICE

(71) Applicant: DMG MORI CO., LTD., Nara (JP)

(72) Inventors: Futoshi Yamazaki, Nara (JP); Yohei Yamaguchi, Nara (JP); Keisuke Takahashi, Nara (JP)

(73) Assignee: DMG MORI CO., LTD., Nara (JP)

( * ) Notice: Subject to any disclaimer, the term of this patent is extended or adjusted under 35 U.S.C. 154(b) by 613 days.

(21) Appl. No.: 18/028,275

(22) PCT Filed: Jun. 22, 2021

(86) PCT No.: PCT/JP2021/023528
§ 371 (c)(1),
(2) Date: Mar. 24, 2023

(87) PCT Pub. No.: WO2022/070530
PCT Pub. Date: Apr. 7, 2022

(65) Prior Publication Data
US 2023/0271290 A1      Aug. 31, 2023

(30) Foreign Application Priority Data

Oct. 1, 2020      (JP) ................................. 2020-166748

(51) Int. Cl.
B23Q 11/08             (2006.01)
(52) U.S. Cl.
CPC ................................ B23Q 11/0825 (2013.01)
(58) Field of Classification Search
CPC . B23Q 11/0825; B23Q 11/0891; B23Q 11/08; B23B 25/04
See application file for complete search history.

(56) References Cited

U.S. PATENT DOCUMENTS 4,955,770 A * 9/1990 Kitamura ........... B23Q 11/0875
409/137
5,482,414 A * 1/1996 Hayashi ............. B23Q 11/0825
29/DIG. 56
(Continued)

FOREIGN PATENT DOCUMENTS

AT           512524 B1 * 9/2013 ........... B23Q 11/124
DE         9013621 U1    3/1991
(Continued)

OTHER PUBLICATIONS

European Search Report for related Application No. 21874834.1; report dated Jan. 2, 2024.

(Continued)

*Primary Examiner* — Nicole N Ramos

(57) ABSTRACT

The present invention includes a plurality of protective bodies (13, 14, 15) sequentially connected in a moving direction of a moving body and separating a movement path of the moving body from the outside. The protective body (15) at a first end is connected to a predetermined end (12a) of an area to be protected, and the protective body (13) at a second end is connected to the moving body. The plurality of protective bodies (13, 14, 15) are configured to be expanded and contracted as a whole by movement of the moving body. A structural body (35) having a groove (35a) having a top opening and forming a flow path is provided. The structural body (35) is arranged along the protective bodies (13, 14, 15) below the protective bodies (13, 14, 15) or arranged along the protective bodies (13, 14, 15) such that the lower ends of the protective bodies (13, 14, 15) are inserted in the groove (35a) through the top opening of the groove (35a). The groove body (35) is provided with a nozzle (38) ejecting a liquid into the groove (35a), and a (Continued)

pressurized liquid is supplied to the nozzle (38) from a liquid supply source (40).

12 Claims, 6 Drawing Sheets

(56)                    References Cited

U.S. PATENT DOCUMENTS

| | | | |
|---|---|---|---|
| 9,162,336 B2 | 10/2015 | Sato | |
| 2014/0286721 A1 * | 9/2014 | Asano ............... | B23Q 11/0825 |
| | | | 409/134 |

FOREIGN PATENT DOCUMENTS

| | | | | |
|---|---|---|---|---|
| DE | 102011114697 A1 * | 3/2013 | ........... | B23Q 11/124 |
| EP | 0523286 A1 | 1/1993 | | |
| EP | 1090714 A2 * | 4/2001 | ......... | B23Q 11/0825 |
| JP | S6175948 U * | 5/1986 | | |
| JP | S62168240 U * | 10/1987 | | |
| JP | H11300573 A | 11/1999 | | |
| JP | 2009241163 A | 10/2009 | | |
| JP | 2018030202 A | 3/2018 | | |
| JP | 6746816 B1 | 8/2020 | | |
| KR | 20180003392 A * | 1/2018 | ......... | B23Q 11/0825 |
| KR | 102042959 B1 * | 11/2019 | ......... | B23Q 11/0875 |
| TW | 1630977 B * | 8/2018 | ......... | B23Q 11/0891 |

OTHER PUBLICATIONS

International Search Report for related Application No. PCT/JP2021/023528; report dated Aug. 17, 2021.

* cited by examiner

FIG. 1

F I G. 2
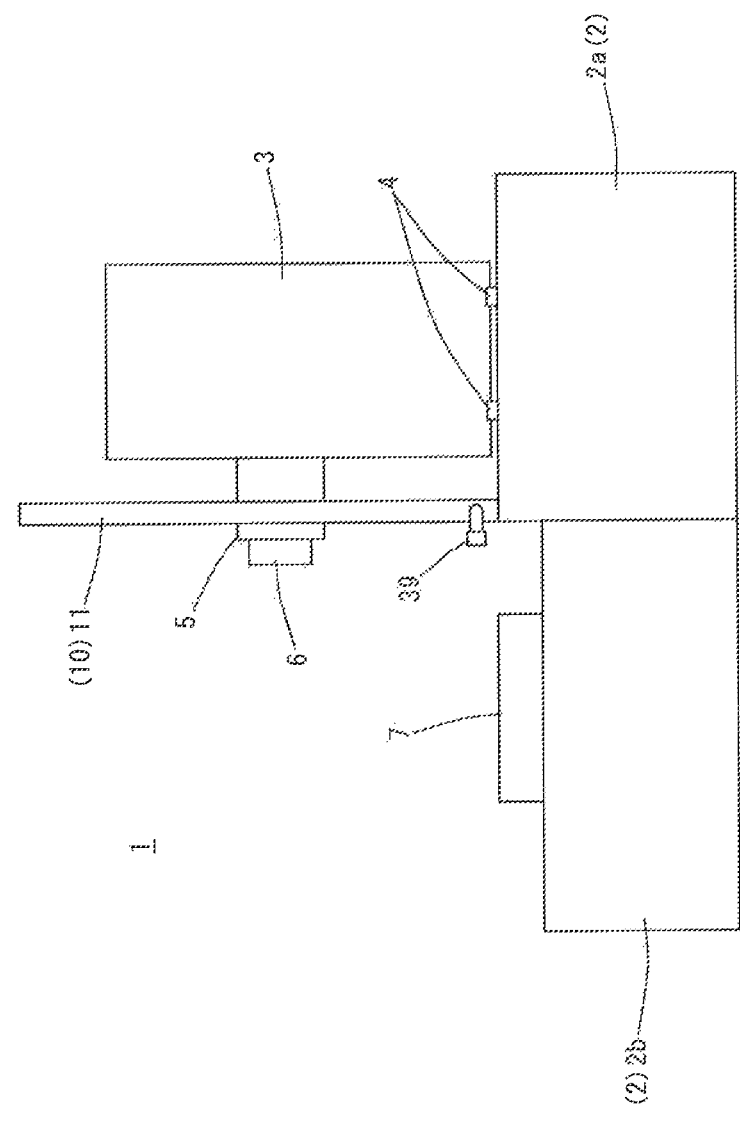

FIG. 3

PROTECTIVE DEVICE

TECHNICAL FIELD

The present invention relates to a protective device that separates from the outside a movement path of a moving body moving in a predetermined direction. In particular, the present invention relates to a protective device that includes a protective body connected to the moving body so as to separate the movement path of the moving body from the outside.

BACKGROUND ART

A covering body for machine tool disclosed in Patent Literature 1 listed below is a known typical example of the protective device as mentioned above. This covering body protects (covers) a feed mechanism for a moving body of a machine tool from chips produced during machining of a workpiece and coolant used during the machining. The covering body includes a fixed cover piece (protective body) and a plurality of movable cover pieces (protective bodies). The fixed cover piece is attached to a predetermined position on a bed or the moving body of the machine tool. The movable cover pieces are attached between the fixed cover piece and the moving body of the machine tool such that they are able to expand and contract.

This covering body is provided with a supplementary cover that expands and contracts by moving along with the movable cover pieces. The supplementary cover is formed by respectively attaching the rear end edge of a supplementary fixed cover piece and the rear end edges of a plurality of supplementary movable cover pieces to the rear end edges of the cover pieces so as to cover a guide rail and a ball screw or at least one of fixed element parts of a linear motor of the feed mechanism for the moving body of the machine tool from above.

Thus, the supplementary cover constituted by the supplementary fixed cover piece and the plurality of supplementary movable cover pieces is provided in the interior of the covering body. Therefore, this covering body is capable of doubly preventing entry of dust into the parts of the feed mechanism reciprocating the moving body. In addition, this covering body can reduce the number of parts, so that the covering body can be attached to the machine tool quickly and easily.

CITATION LIST

Patent Literature

Patent Literature 1: Japanese Unexamined Patent Application Publication No. 2009-241163

SUMMARY OF INVENTION

Technical Problem

In the above-described machine tool, chips produced during machining of a workpiece fall onto the movable cover pieces and fixed cover piece of the covering body and coolant used during the machining spatters over the movable cover pieces and fixed cover piece of the covering body. The movable cover pieces of the covering body slidably move in contact with one another in accordance with movement of the moving body in such a situation. The movable cover pieces contract by moving to be stacked one on another, and expand by moving to be spread out from one another.

Such movable cover pieces typically have elastic sealing members at the contact portions thereof. These sealing members prevent the chips and coolant from entering into the interior of the covering body.

With this conventional covering body, entry of relatively large chips into the interior of the covering body is effectively prevented by the sealing members. However, entry of relatively small chips or powdered chips into the interior of the covering body cannot be completely prevented by the sealing members. Therefore, such chips can enter behind the movable cover pieces through the sealed portions along with movement of the movable cover pieces.

Further, the chips having entered behind the movable cover pieces fall into a groove body arranged along the lower ends of the movable cover pieces so as to receive the lower ends of the movable cover pieces. The chips having fallen into the groove body are pushed to the fixed cover piece side by movement of the movable cover pieces and accumulate there.

Such an accumulation of chips in the groove body resists and obstructs movement of the movable cover pieces. Consequently, the movable cover pieces are subjected to plastic deformation or the cover pieces are broken due to such plastic deformation.

The present invention has been achieved in view of the above-described circumstances, and an object of the invention is to provide a protective device that is capable of preventing accumulation of chips in a groove body arranged along the lower ends of protective bodies constituting the protective device.

Solution to Problem

To solve the above-described problem, the present invention provides a protective device including a plurality of protective bodies connected so as to separate from outside a movement path of a moving body moving in a predetermined direction and so as to be located sequentially and continuously in a moving direction of the moving body, the protective body located at a first end being connected to a predetermined end of an area to be protected, the protective body located at a second end being connected to the moving body, the plurality of protective bodies being configured to be expanded and contracted as a whole by movement of the moving body, the protective device being provided with:

a structural body having a groove having a top opening and forming a flow path, the structural body being arranged along the plurality of protective bodies below the protective bodies with a predetermined distance from lower end surfaces of the protective bodies or arranged along the plurality of protective bodies such that lower ends of the protective bodies are inserted in the groove through the top opening of the groove;

a nozzle connected to the structural body and configured to eject a liquid into the groove of the structural body; and a liquid supply source configured to supply a pressurized liquid to the nozzle.

With this protective device, the movement path of the moving body is separated from the outside by the plurality of protective bodies that are sequentially and continuously connected and configured to be expanded and contracted by movement of the moving body. Therefore, for example, even if chips are produced during machining or coolant used during machining is scattered in the outside, entry of the chips or coolant into the movement path of the moving body is prevented by the protective bodies.

Below the plurality of protective bodies, the structural body that has the groove having a top opening and forming a flow path is arranged along the protective bodies below the protective bodies with a predetermined distance from the lower end surfaces of the protective bodies or arranged along the protective bodies such that the lower ends of the protective bodies are inserted in the groove through the top opening of the groove. A pressurized liquid is supplied into the groove of this structural body from the liquid supply source. The liquid is ejected from the nozzle connected to the structural body and then flows in the groove.

Thus, the protective device according to the present invention is configured such that a liquid flows in the groove of the structural body. Therefore, even if relatively small chips or powdered chips enter behind the protective bodies through the connections between the protective bodies and fall into the groove of the structural body, the chips having fallen into the groove are washed away by the liquid flowing in the groove and then flows out to the outside from the groove. In this manner, accumulation of chips in the groove is prevented so that movement of the protective bodies is prevented from being obstructed by chips accumulated in the groove. Consequently, the protective bodies are prevented from being subjected to plastic deformation or being broken due to plastic deformation.

In the present invention, it is preferred that: the structural body is arranged along the protective bodies so as to correspond to entire lower surfaces of the protective bodies when the protective bodies are expanded; the structural body has a side wall on at least an end portion thereof located on the first end side to block the groove; and the nozzle is arranged on the side wall of the structural body. With this configuration, the liquid ejected from the nozzle arranged on the side wall on the first-end side end portion of the structural body flows to the second end side in the groove of the structural body, so that chips having fallen into the groove are wash away to the second end side by the liquid and then flows out to the outside.

In this case, it is preferred that at least a portion of the side wall has a downward inclined surface inclined downward to the second end side. With this configuration, the liquid ejected from the nozzle flows downward while being guided by the downward inclined surface and then flows along the bottom of the groove. Thus, this configuration enables the liquid ejected from the nozzle to flow smoothly in the groove without being disturbed.

In the present invention, it is preferred that the nozzle is arranged so as to eject the liquid downward. This configuration prevents the liquid ejected from the nozzle from colliding with the protective bodies, so that the liquid is prevented from being scattered around due to collision with the protective bodies.

In the present invention, it is preferred that the groove of the structural body has a U-shaped or V-shaped cross section. With this configuration, the liquid flows along the bottom of the groove. Thus, this configuration also prevents the liquid from colliding with the protective bodies, so that the liquid is prevented from being scattered around due to collision with the protective bodies.

Advantageous Effects of Invention

As described above, the protective device according to the present invention is configured such that a liquid flows in the groove of the structural body. Therefore, even if relatively small chips or powdered chips enter behind the protective bodies through the connections between the protective bodies and fall into the groove of the structural body, the chips having fallen into the groove are washed away by the liquid flowing in the groove and then flows out to the outside from the groove. In this manner, accumulation of chips in the groove is prevented so that movement of the protective bodies is prevented from being obstructed by chips accumulated in the groove. Consequently, the protective bodies are prevented from being subjected to plastic deformation or being broken due to plastic deformation.

BRIEF DESCRIPTION OF DRAWINGS

FIG. 1 is a perspective view schematically illustrating a configuration of a machine tool including a protective device according to an embodiment of the present invention;

FIG. 2 is a side view in the direction of arrow A in FIG. 1;

FIG. 3 is a back view of the protective device as viewed from a protected side, i.e., in the direction of arrow B in FIG. 1;

DESCRIPTION OF EMBODIMENTS

Figure 1:
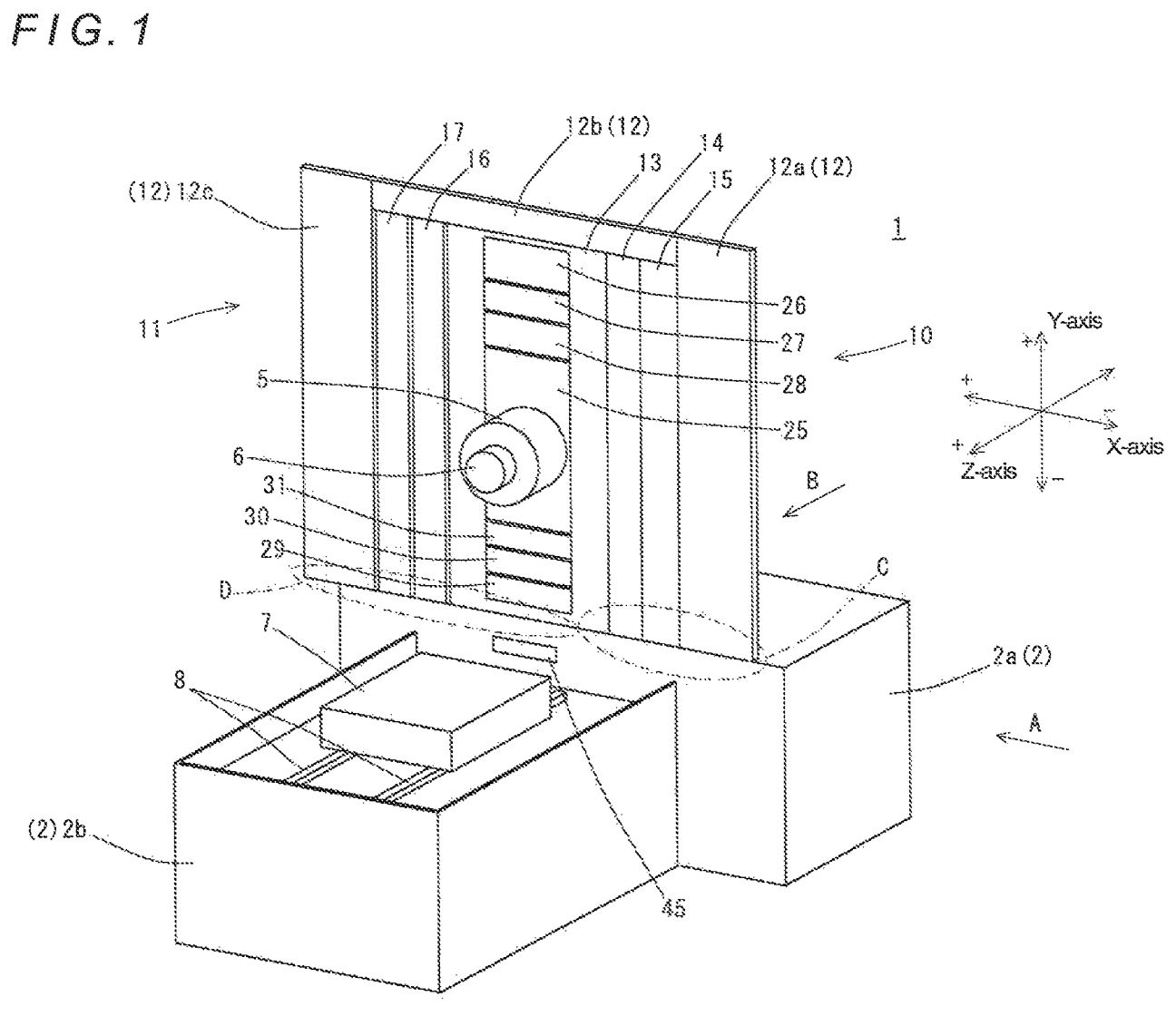
Figure 4:
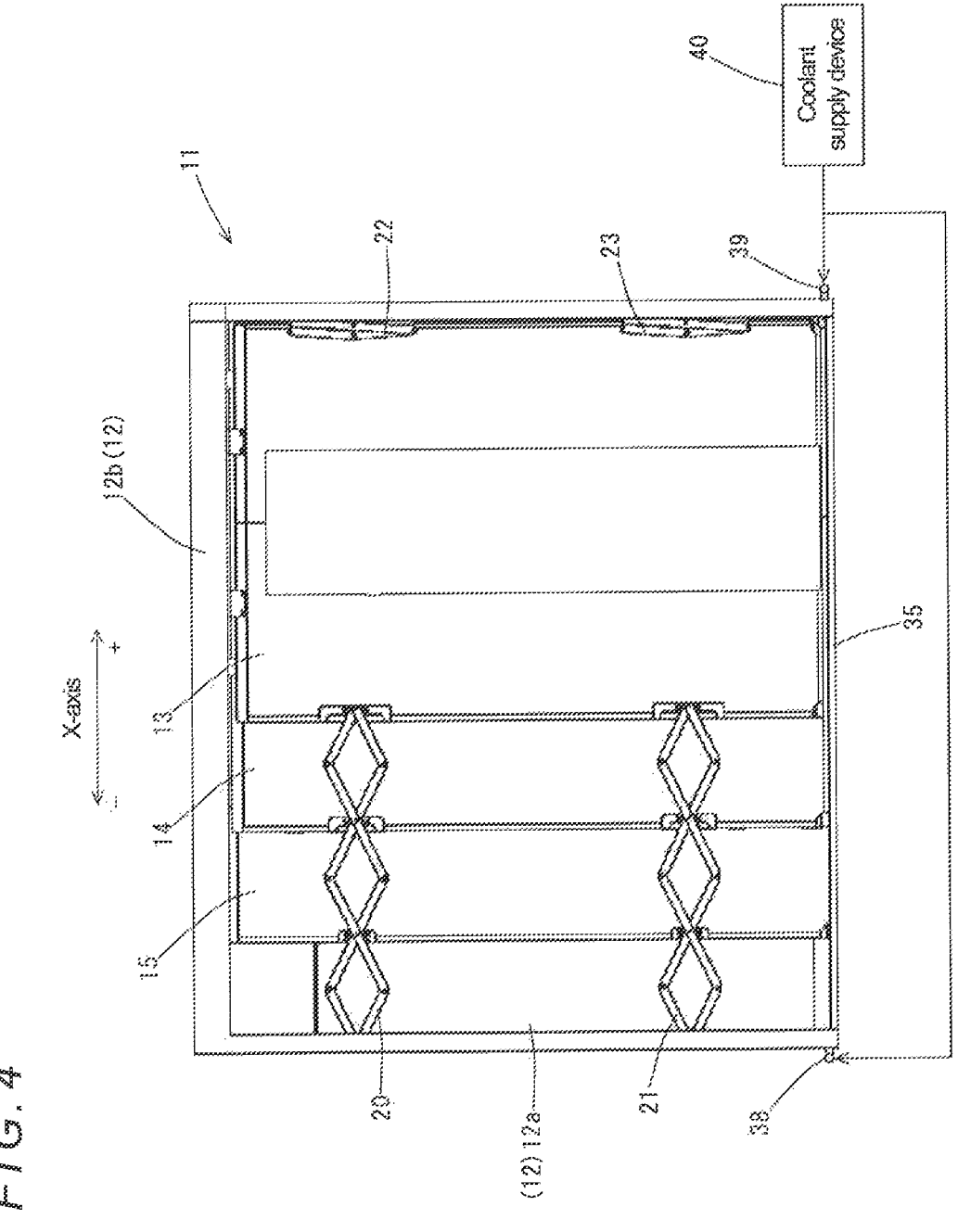
FIG. 4 is an illustrative diagram of operation of a protective body unit in the embodiment.
Figure 5:
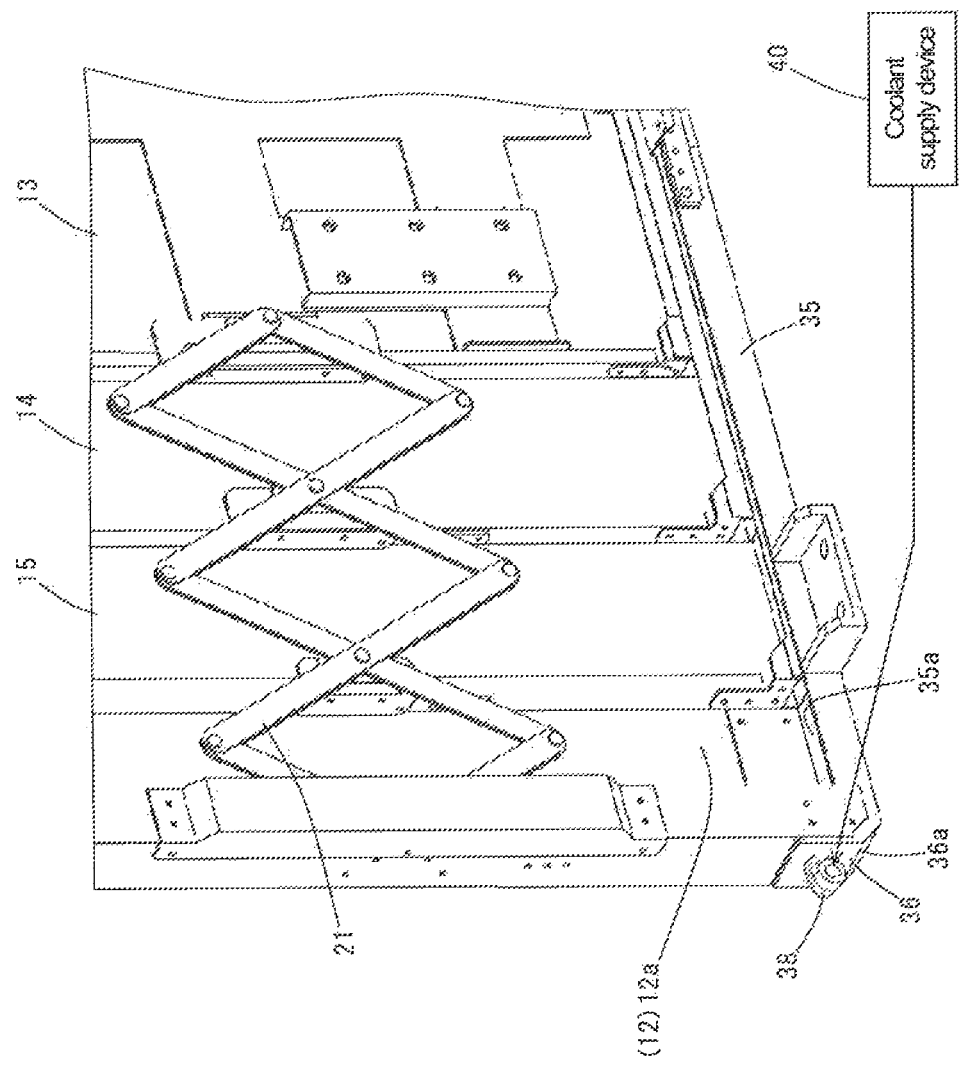
FIG. 5 is a perspective view of the circled area C as viewed in the direction of arrow B in FIG. 1.
Figure 6:
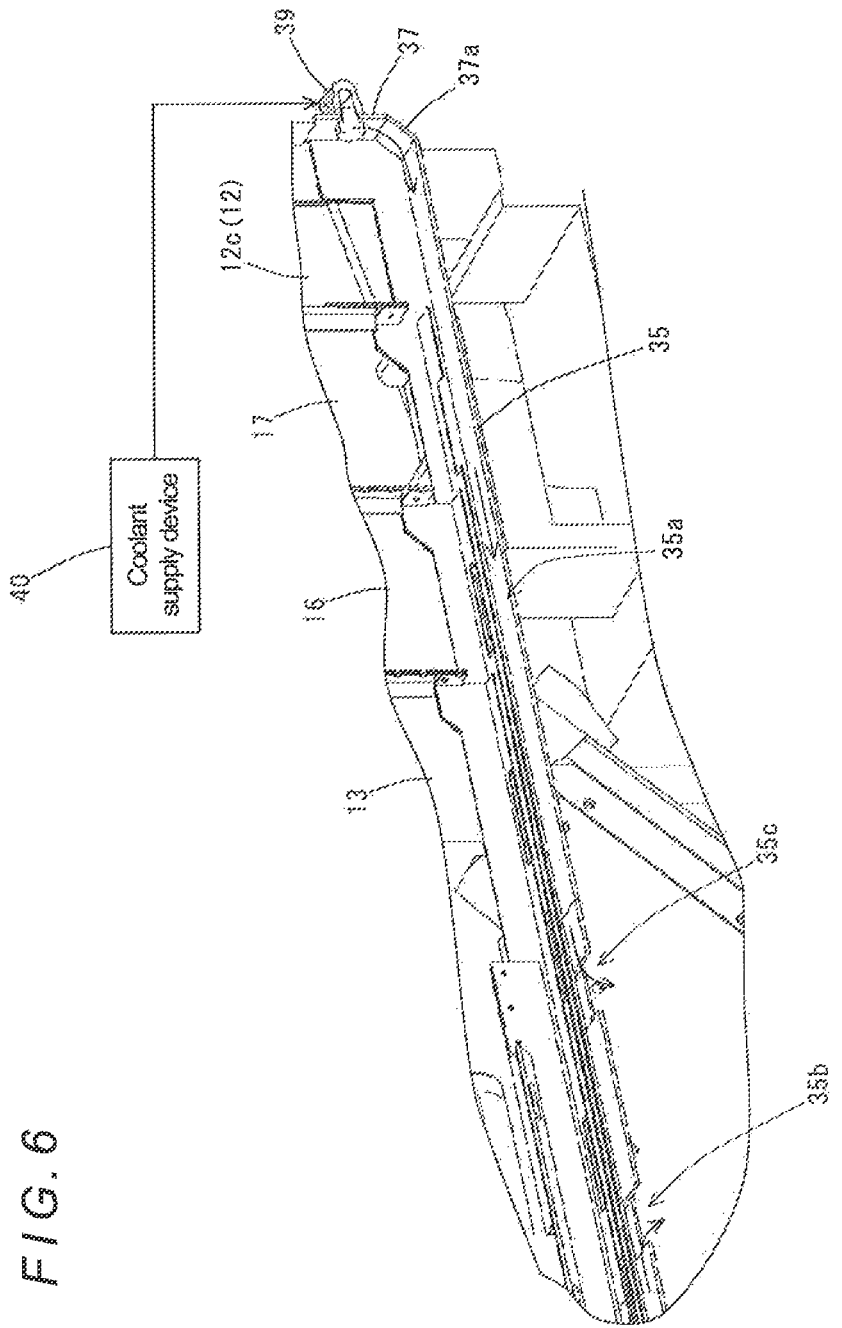
FIG. 6 is a perspective view of the circled area D as viewed in the direction of arrow B in FIG. 1 and also a sectional view taken along the longitudinal direction of a groove body.

Hereinafter, an embodiment of the present invention will be described with reference to the drawings. As illustrated in FIGS. 1 and 2, a machine tool 1 in this embodiment is a horizontal machining center that includes a bed 2, a column 3, a spindle head 5, a table 7, and a protective device 10. Note that FIGS. 1 and 2, showing overall views of the machine tool 1, illustrate only elements which are essential in this embodiment.

The bed 2 consists of a first bed 2a and a second bed 2b. The first bed 2a is of a linear shape. The second bed 2b is also of a linear shape and is connected perpendicularly to the first bed 2a. Thus, the bed 2 as a whole has a T shape in plan view. The table 7 is disposed on the second bed 2b and arranged to be moved back and forth with respect to the first bed 2a, i.e., moved in the direction of a horizontal Z-axis, while being guided by guide rails 8.

The column 3 is disposed on the first bed 2a and arranged to be moved in the direction of an X-axis horizontally perpendicular to the Z-axis while being guided by guide rails 4. The spindle head 5 supports a spindle 6 such that the spindle 6 is rotatable. The spindle head 5 is held by the column 3 to be movable in the direction of a vertical Y-axis perpendicular to both the X-axis and the Z-axis. Thus, the spindle head 5 is moved in a plane defined by the X-axis and the Y-axis.

As illustrated in FIGS. 1 to 6, the protective device 10 is constituted by a protective body unit 11, four pantograph mechanisms 20, 21, 22, and 23, a groove body 35 as a structural body having a groove 35a, and a coolant supply device 40. The protective body unit 11 is erected on the first bed 2a so as to separate movement paths of the column 3 and spindle head 5 from the outside, i.e., from a machining area in this embodiment. It is to be understood that the machining area in this embodiment refers to the area above the second bed 2*b* having the table 7 disposed thereon.

Figure 3:
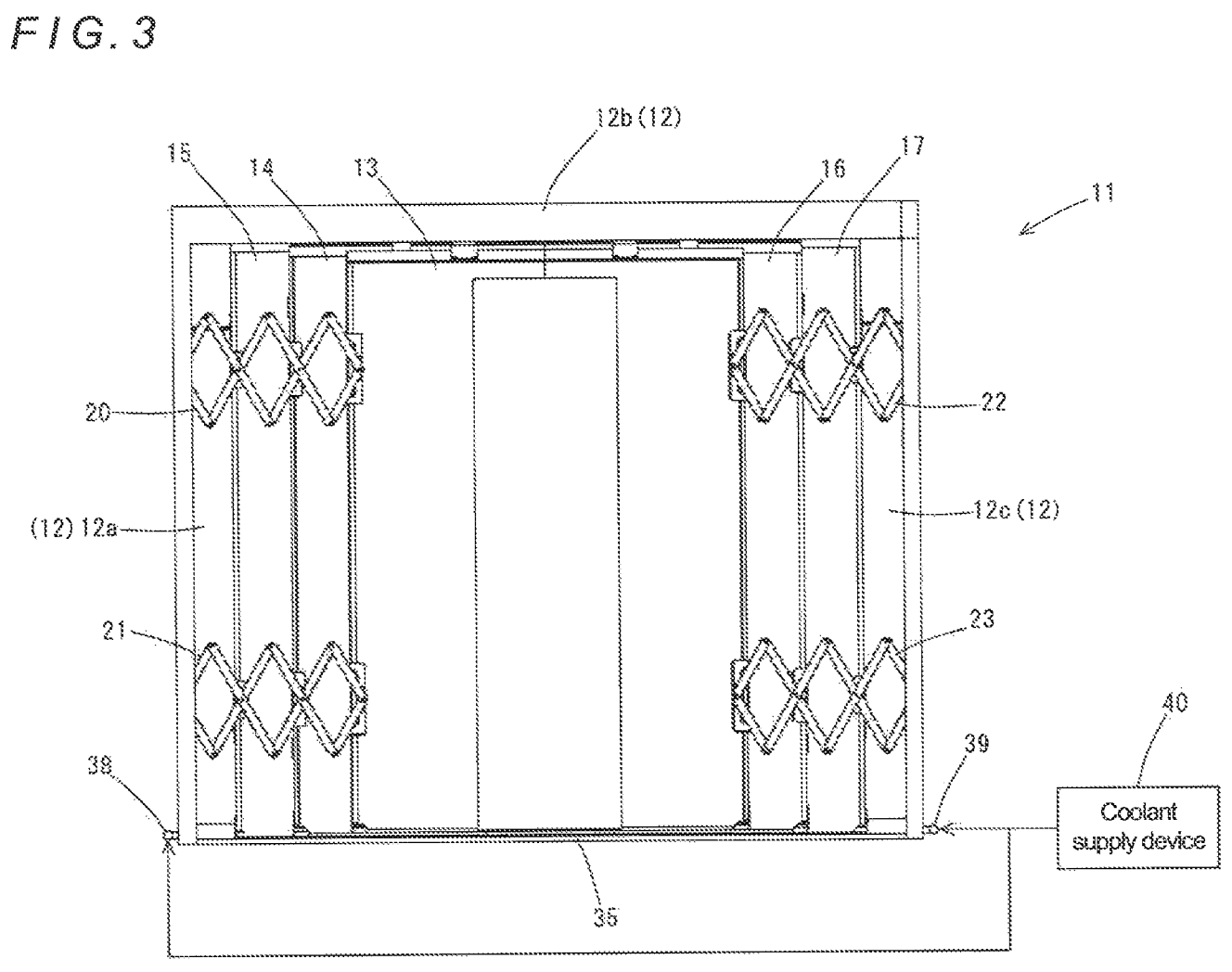

As illustrated in FIGS. 1 and 3, the protective body unit 11 is constituted by a gate-shaped fixed panel 12, a holding panel 13, sliding panels 14, 15, 16, and 17, a fixed panel 25, and sliding panels 26, 27, 28, 29, 30, and 31. The holding panel 13 an, the sliding panels 14, 15, 16, and 17 each have a rectangular shape and are arranged inside the gate-shaped fixed panel 12. The fixed panel 12 consists of two vertical parts 12*a* and 12*c* and a horizontal part 12*b*. The vertical parts 12*a* and 12*c* are erected with a predetermined spacing therebetween. The horizontal part 12*b* is arranged between upper portions of the vertical parts 12*a* and 12*c* so as to connect the vertical parts 12*a* and 12*c* to each other.

The holding panel 13 is composed of a frame-shaped panel that is rectangularly hollowed out such that the spindle head 5 is inserted therethrough. The fixed panel 25 and the sliding panels 26, 27, 28, 29, 30, and 31 are arranged inside the frame of the holding panel 13. The gate-shaped fixed panel 12 and the holding panel 13 have right and left spaces formed therebetween. The right space has the sliding panels 14 and 15 arranged therein, while the left space has the sliding panels 16 and 17 arranged therein.

The sliding panels 14 and 15 are hung from the horizontal part 12*b* of the fixed panel 12 to be slidable in the X-axis direction and are positioned in the order of the vertical part 12*a* of the fixed panel 12, the sliding panel 15, the sliding panel 14, and the holding panel 13 from the second bed 2*b* side to the first bed 2*a* side. The sliding panels 14 and 15 slide in contact with each other to be stacked one behind the other. The sliding panel 14 slides in contact with the holding panel 13 to be stacked one behind the other. The sliding panel 15 slides in contact with the vertical part 12*a* of the fixed panel 12 to be stacked one behind the other.

The vertical part 12*a* of the fixed panel 12, the sliding panels 15 and 14, and the holding panel 13 are connected by two pantograph mechanisms 20 and 21 arranged one above the other. The holding panel 13 and the sliding panels 14 and 15 are synchronously moved in the X-axis direction by operation of the pantograph mechanisms 20 and 21. The holding panel 13 and the sliding panels 14 and 15 contract by sliding in the direction in which they are stacked one behind another, and expand by sliding in the direction in which they are spread out from one another.

The sliding panels 16 and 17 are also hung from the horizontal part 12*b* of the fixed panel 12 to be slidable in the X-axis direction and are positioned in the order of the vertical part 12*c* of the fixed panel 12, the sliding panel 17, the sliding panel 16, and the holding panel 13 from the second bed 2*b* side to the first bed 2*a* side. The sliding panels 16 and 17 slide in contact with each other to be stacked one behind the other. The sliding panel 16 slides in contact with the holding panel 13 to be stacked one behind the other. The sliding panel 17 slides in contact with the vertical part 12*c* of the fixed panel 12 to be stacked one behind the other.

The vertical part 12*c* of the fixed panel 12, the sliding panels 17 and 16, and the holding panel 13 are connected by two pantograph mechanisms 22 and 23 arranged one above the other. The holding panel 13 and the sliding panels 16 and 17 are synchronously moved in the X-axis direction by operation of the pantograph mechanisms 22 and 23. The holding panel 13 and the sliding panels 16 and 17 contract by sliding in the direction in which they are stacked one behind another, and expand by sliding in the direction in which they are spread out from one another.

Thus, when the column 3 and the spindle head 5 are moved to the plus side in the X-axis direction, the region between the holding panel 13 and the vertical part 12*a* of the fixed panel 12 expands and the region between the holding panel 13 and the vertical part 12*c* of the fixed panel 12 contracts (see FIG. 4). On the other hand, when the column 3 and the spindle head 5 are moved to the minus side in the X-axis direction, the region between the holding panel 13 and the vertical part 12*a* of the fixed panel 12 contracts and the region between the holding panel 13 and the vertical part 12*c* of the fixed panel 12 expands.

The fixed panel 25 is fixed to the spindle head 5 with the spindle head 5 inserted through the fixed panel 25. The fixed panel 25 and the holding panel 13 have upper and lower spaces formed therebetween. The upper space has the sliding panels 26, 27, and 28 arranged therein, while the lower space has the sliding panels 29, 30, and 31 arranged therein.

The sliding panels 26, 27, and 28 are arranged to be slidable in the Y-axis direction and are positioned in the order of the sliding panel 26, the sliding panel 27, the sliding panel 28, and the fixed panel 25 from the second bed 2*b* side to the first bed 2*a* side. The sliding panels 26 and 27 slide in contact with each other to be stacked one behind the other. The sliding panels 27 and 28 slide in contact with each other to be stacked one behind the other. The sliding panel 28 slides in contact with the fixed panel 25 to be stacked one behind the other. The sliding panel 26 slides in contact with the holding panel 13 to be stacked one behind the other.

Although not illustrated in the drawings, the fixed panel 25, the sliding panels 28, 27, and 26, and the holding panel 13 are connected by a pantograph mechanism. The fixed panel 25 and the sliding panels 28, 27, and 26 are synchronously moved in the Y-axis direction by operation of the pantograph mechanism. The fixed panel 25 and the sliding panels 28, 27, and 26 contract by sliding in the direction in which they are stacked one behind another, and expand by sliding in the direction in which they are spread out from one another.

The sliding panels 29, 30, and 31 are also arranged to be slidable in the Y-axis direction and are positioned in the order of the sliding panel 29, the sliding panel 30, the sliding panel 31, and the fixed panel 25 from the second bed 2*b* side to the first bed 2*a* side. The sliding panels 29 and 30 slide in contact with each other to be stacked one behind the other. The sliding panels 30 and 31 slide in contact with each other to be stacked one behind the other. The sliding panel 31 slides in contact with the fixed panel 25 to be stacked one behind the other. The sliding panel 29 slides in contact with the holding panel 13 to be stacked one behind the other.

Although not illustrated in the drawings, the fixed panel 25, the sliding panels 31, 30, and 29, and the holding panel 13 are connected by a pantograph mechanism. The fixed panel 25 and the sliding panels 31, 30, and 29 are synchronously moved in the Y-axis direction by operation of the pantograph mechanism. The fixed panel 25 and the sliding panels 31, 30, and 29 contract by sliding in the direction in which they are stacked one behind another, and expand by sliding in the direction in which they are spread out from one another.

Thus, when the spindle head 5 is moved to the plus side in the Y-axis direction, the sliding panels 26, 27, and 28 contract and the sliding panels 29, 30, and 31 expand. On the other hand, when the spindle head 5 is moved to the minus side in the Y-axis direction, the sliding panels 26, 27, and 28 expand and the sliding panels 29, 30, and 31 contract.

The groove body 35 is composed of a structural body having a groove 35*a* that has a top opening and forms a flow path. Thus, the groove body 35 has a substantially U-shaped cross section. The groove body 35 is arranged such that the lower ends of the vertical parts 12*a* and 12*c* of the fixed panel 12, the lower end of the holding panel 13, and the lower ends of the sliding panels 14, 15, 16, and 17 are inserted in the groove 35*a* through the top opening of the groove 35*a*. Both ends of the groove body 35 are respectively connected to the lower ends of the vertical parts 12*a* and 12*c* of the fixed panel 12.

Further, the groove body 35 has side walls 36 and 37 respectively at both ends thereof, and the side walls 36 and 37 function to block the groove 35*a*. Each side wall 36, 37 has an upper portion forming a vertical portion 36*a*, 37*a* and has a lower portion forming an inclined portion 36*b*, 37*b* inclined downward to the other side wall side. The vertical portions 36*a* and 37*a* respectively have nozzles 38 and 39 arranged thereon. Each nozzle 38, 39 penetrates the vertical portion 36*a*, 37*a* and is fixed to the vertical portion 36*a*, 37*a* with its ejection port directed downward and positioned inside the groove 35*a*. To each nozzle 38, 39, pressurized coolant is supplied from the coolant supply device 40 that supplies coolant into the machining area of the machine tool 1.

The groove body 35 has two discharge ports 35*b* and 35*c* formed in the bottom thereof in the vicinity of the center in the longitudinal direction thereof. Each discharge port 35*b*, 35*c* communicates, through an appropriate flow path, with a flow-out port 45 that is open in the front face of the first bed 2*a*.

Thus, coolant supplied to each nozzle 38, 39 from the coolant supply device 40 is ejected from the ejection port of the nozzle 38, 39 toward the inclined portion 36*b*, 37*b* of the side wall 36, 37 located below. The coolant flows along the inclined portion 36*b*, 37*b* and then in the groove 35. Eventually, the coolant is discharged through the discharge port 35*b*, 35*c* and then flows out onto the second bed 2*b* through the flow-out port 45 formed in the front face of the first bed 2*a*.

Note that the second bed 2*b* has an opening formed for collecting machining chips produced during machining and coolant supplied into the machining area. The coolant having flowed out onto the second bed 2*b* through the flow-out port 45 is returned to the coolant supply device 40 through the opening.

In the machine tool 1 in this embodiment having the above-described configuration, the movement paths of the column 3 and spindle head 5 are separated from the machining area by the protective body unit 11 of the protective device 10. Therefore, even if chips are produced during machining or coolant supplied during machining is scattered in the machining area, entry of the chips or coolant into the movement paths of the column 3 and spindle head 5 is prevented by the protective body unit 11.

The protective body unit 11 expands and contracts at the region between the holding panel 13 and the vertical part 12*a* of the fixed panel 12 and the region between the holding panel 13 and the vertical part 12*c* of the fixed panel 12 along with movement of the spindle head 5 in the X-axis direction. Because these expanding and contracting regions have the sliding contact portions, namely, the sliding contact portions formed between the holding panel 13 and the sliding panel 14, between the sliding panel 14 and the sliding panel 15, between the vertical part 12*a* of the fixed panel 12 and the sliding panel 15, between the holding panel 13 and the sliding panel 16, between the sliding panel 16 and the sliding panel 17, and between the vertical part 12*c* of the fixed panel 12 and the sliding panel 17, it is possible that relatively small chips or powdered chips enter behind the protective body unit 11 through these sliding contact portions and fall downward.

The protective device 10 according to this embodiment includes the groove body 35 arranged such that the lower ends of the vertical parts 12*a* and 12*c* of the fixed panel 12, the lower end of the holding panel 13, the lower ends of the sliding panels 14, 15, 16, and 17 are inserted in the groove 35*a*, and the protective device 10 is configured such that coolant is supplied into the groove 35*a* from the coolant supply device 40 and the coolant flows in the groove 35*a* from the side walls 36 and 37 at the ends of the groove 35*a* toward the discharge ports 35*b* and 35*c* at the center of the groove 35*a*. Therefore, the above-described chips having entered behind the protective body unit 11 and fallen downward are collected into the groove 35*a* of the groove body 35 and then washed away by the coolant flowing in the groove 35*a*, so that the chips are discharged through the discharge ports 35*b* and 35*c*. Thereafter, the chips flow out onto the second bed 2*b* through the flow-out port 45 and are appropriately collected through the opening formed in the second bed 2*b*.

In this manner, accumulation of chips in the groove 35*a* is prevented so that movement of the sliding panels 14, 15, 16, and 17 is prevented from being obstructed by chips accumulated in the groove 35*a*. Consequently, the sliding panels 14, 15, 16, and 17 are prevented from being subjected to plastic deformation or being broken due to plastic deformation.

Further, the nozzles 38 and 39 in this embodiment are arranged so as to eject coolant downward from their respective ejection ports. This configuration prevents the coolant ejected from each nozzle 38, 39 from colliding with the lower ends of the sliding panels 14, 15, 16, and 17, so that the coolant is prevented from being scattered around due to such a collision.

Further, the side walls 36 and 37 each have the lower portion forming the inclined portion 36*b*, 37*b* inclined downward to the other side wall side. Therefore, the coolant ejected from the ejection port of each nozzle 38, 39 flows downward while being guided by the inclined surface of the inclined portion 36*b*, 37*b* and then flows along the bottom of the groove 35*a*. Thus, the liquid ejected from each nozzle 38, 39 flows smoothly in the groove 35*a* without being disturbed or being scattered around.

Further, the groove body 35 in this embodiment has a U-shaped cross section. Therefore, the coolant flows along the bottom of the groove 35*a*. Thus, this configuration also prevents the coolant from colliding with the lower ends of the sliding panels 14, 15, 16, and 17, so that the coolant is prevented from being scattered around due to such a collision.

Above has been described an embodiment of the present invention. However, it should be noted that the present invention is not limited to the above-described embodiment and can be implemented in other manners.

For example, the side walls 36 and 37 respectively have the nozzles 38 and 39 arranged thereon. However, the present invention is not limited to this configuration. The protective device 10 may have a configuration in which only either one of the side walls 36 and 37 has a nozzle arranged thereon. In this case, it is preferred that the groove body 35 has a discharge port formed therein near the side wall having no nozzle arranged thereon.

Further, the nozzles 38 and 39 in the above-described embodiment are configured to eject coolant downward from their respective ejection ports. However, the present invention is not limited to this configuration. The nozzles 38 and 39 may each be configured to eject coolant obliquely downward to the other nozzle side within the range where the coolant does not directly collide with the lower ends of the sliding panels 14, 15, 16, and 17.

Further, the side walls 36 and 37 in the above-described embodiment are each constituted by the vertical portion 36a, 37a located above and the inclined portion 36b, 37b located below. However, the present invention is not limited to such a side wall. The side walls 36 and 37 may each be constituted by only the vertical portion 36a, 37a or by only the inclined portion 36b, 37b unless that obstructs the flow of coolant. Further, the inclined portion 36b, 37b is not limited to having a flat surface and may have a curved surface curved with a predetermined curvature.

Further, the groove body 35 in the above-described embodiment is arranged such that the lower ends of the vertical parts 12a and 12c of the fixed panel 12, the lower end of the holding panel 13, and the lower ends of the sliding panels 14, 15, 16, and 17 are inserted in the groove 35a. However, the present invention is not limited to this configuration. The groove body 35 may be arranged below the vertical parts 12a and 12c of the fixed panel 12, the holding panel 13, and the sliding panels 14, 15, 16, and 17. This configuration is capable of preventing coolant ejected in a horizontal direction from each nozzle 38 and 39 from colliding with the lower ends of the sliding panels 14, 15, 16, and 17.

Further, the groove body 35 in the above-described embodiment has a U-shaped cross section. However, the present invention is not limited to such a groove body. The groove body 35 may have a V-shaped cross section. Such a groove body 35 also provides the same effect as that provided by the groove body 35 in the above-described embodiment.

Further, the protective device 10 in the above-described embodiment is applied to a horizontal machining center. However, the protective device 10 is not limited to application to such a machine tool. It is to be understood that the protective device 10 may be applied to any other type of machine tool unless there is a significant disadvantage.

As already mentioned above, the foregoing description of the embodiments is not limitative but illustrative in all aspects. One skilled in the art would be able to make variations and modifications as appropriate. The scope of the invention is not defined by the above-described embodiments, but is defined by the appended claims. Further, the scope of the invention encompasses all modifications made from the embodiments within a scope equivalent to the scope of the claims.

REFERENCE SIGNS LIST

1 Machine tool
2 Bed
3 Column
5 Spindle head
6 Spindle
10 Protective device
11 Protective body unit
12 Fixed panel
13 Holding panel
14, 15, 16, 17 Sliding panel
20, 21, 22, 23 Pantograph mechanism
25 Fixed panel
26, 27, 28, 29, 30, 31 Sliding panel
35 Groove body

35a Groove
36, 37 Side wall
36a, 37a Vertical portion
36b, 37b Inclined portion
38, 39 Nozzle
40 Coolant supply device

The invention claimed is:

1. A protective device comprising:
a plurality of protective bodies connected so as to separate an inside accommodating a movement path of a moving body moving in a predetermined direction from an outside and so as to be located sequentially and continuously in a moving direction of the moving body, the plurality of protective bodies including a first protective body and a second protective body, the first protective body located at a first end being connected to a predetermined end of an area to be protected, the second protective body located at a second end being connected to the moving body, the plurality of protective bodies being configured to be expanded and contracted as a whole by movement of the moving body, wherein:
the protective device is provided with:
a structural body having a groove that is located at the inside, has a top opening that opens upward in a vertical direction, and forms a flow path at the inside of the plurality of protective bodies, the structural body being arranged along the plurality of protective bodies below the protective bodies with a predetermined distance from lower end surfaces of the protective bodies or arranged along the plurality of protective bodies such that lower ends of the protective bodies are inserted in the groove through the top opening of the groove;
a nozzle connected to the structural body and configured to eject a liquid into the groove of the structural body, that is located at the inside; and
a liquid supply source configured to supply a pressurized liquid to the nozzle.

2. The protective device according to claim 1, wherein:
the structural body is arranged along the protective bodies so as to face to entire lower end surfaces of the protective bodies when the protective bodies are expanded;
the structural body has a side wall on at least an end portion of the structural body located on a first end side of the structural body to block the groove; and
the nozzle is arranged on the side wall of the structural body.

3. The protective device according to claim 2, wherein at least a portion of the side wall forms a downward inclined surface inclined downward and inward from the first end side to a second end side that is opposite side to the first end side.

4. The protective device according to claim 1, wherein the nozzle is arranged so as to eject the liquid downward in the vertical direction.

5. The protective device according to claim 1, wherein groove of the structural body has a U-shaped or V-shaped cross section.

6. The protective device according to claim 2, wherein the nozzle is arranged so as to eject the liquid downward in the vertical direction.

7. The protective device according to claim 3, wherein the nozzle is arranged so as to eject the liquid downward in the vertical direction.

8. The protective device according to claim 2, wherein the groove of the structural body has a U-shaped or V-shaped cross section.

9. The protective device according to claim 3, wherein the groove of the structural body has a U-shaped or V-shaped cross section.

10. The protective device according to claim 4, wherein the groove of the structural body has a U-shaped or V-shaped cross section.

11. The protective device according to claim 6, wherein the groove of the structural body has a U-shaped or V-shaped cross section.

12. The protective device according to claim 7, wherein the groove of the structural body has a U-shaped or V-shaped cross section.

\* \* \* \* \*